US011370492B2

(12) United States Patent
Greber

(10) Patent No.: US 11,370,492 B2
(45) Date of Patent: Jun. 28, 2022

(54) VEHICLE CHASSIS WITH ELECTRICAL STORAGE CELL INTEGRATION

(71) Applicant: FAURECIA SYSTEMES D'ECHAPPEMENT, Nanterre (FR)

(72) Inventor: Frédéric Greber, Parrot (FR)

(73) Assignee: FAURECIA SYSTEMES D'ECHAPPEMENT

( * ) Notice: Subject to any disclaimer, the term of this patent is extended or adjusted under 35 U.S.C. 154(b) by 26 days.

(21) Appl. No.: 16/943,612

(22) Filed: Jul. 30, 2020

(65) Prior Publication Data

US 2021/0031836 A1 Feb. 4, 2021

(30) Foreign Application Priority Data

Jul. 31, 2019 (FR) ...................................... 1908762

(51) Int. Cl.
| | | |
|---|---|---|
| *B60K 1/04* | (2019.01) | |
| *B62D 21/17* | (2006.01) | |
| *H01M 10/613* | (2014.01) | |
| *H01M 10/625* | (2014.01) | |
| *H01M 10/6556* | (2014.01) | |
| *H01M 10/6568* | (2014.01) | |
| *B60K 11/00* | (2006.01) | |
| *B60N 2/015* | (2006.01) | |
| *B62D 25/20* | (2006.01) | |

(Continued)

(52) U.S. Cl.
CPC ................ *B62D 21/17* (2013.01); *B60K 1/04* (2013.01); *B60K 11/00* (2013.01); *B60N 2/015* (2013.01); *B62D 25/20* (2013.01); *H01M 10/613* (2015.04); *H01M 10/625* (2015.04); *H01M 10/6556* (2015.04); *H01M 10/6568* (2015.04); *B60K 6/28* (2013.01); *B60K 2001/005* (2013.01); *B60K 2001/0438* (2013.01); *B60Y 2200/91* (2013.01); *B60Y 2200/92* (2013.01); *B60Y 2306/05* (2013.01); *B60Y 2400/11* (2013.01); *H01M 2220/20* (2013.01)

(58) Field of Classification Search
CPC .......... H01M 10/6568; H01M 10/6556; B60K 11/04; B60K 1/04
See application file for complete search history.

(56) References Cited

U.S. PATENT DOCUMENTS

| | | |
|---|---|---|
| 2007/0087266 A1 | 4/2007 | Bourke et al. |
| 2012/0315528 A1 | 12/2012 | Rajaie et al. |
| 2020/0350522 A1* | 11/2020 | Choi ................... H01M 10/625 |

FOREIGN PATENT DOCUMENTS

FR 3060206 A1 6/2018

* cited by examiner

*Primary Examiner* — Jonathan Ng
*Assistant Examiner* — James J Triggs
(74) *Attorney, Agent, or Firm* — Barnes & Thornburg LLP

(57) ABSTRACT

A vehicle chassis is designed to contain at least one electricity storage cells' module. The chassis comprises a bottom panel and at least one housing for the at least one electricity storage cells' module, each housing comprising a cover, the bottom panel supporting the housing in at least one region of contact with the housing. The chassis also comprises a cooling circuit of the at least one electricity storage cells' module. The cooling circuit is a closed circuit designed to guide a heat transfer fluid. The cooling circuit extends into the bottom panel and is set back from the contact region. The bottom panel comprises at least two flat plates and an embossed plate extending between the two flat plates.

10 Claims, 7 Drawing Sheets

(51) Int. Cl.
*B60K 6/28* (2007.10)
*B60K 1/00* (2006.01)

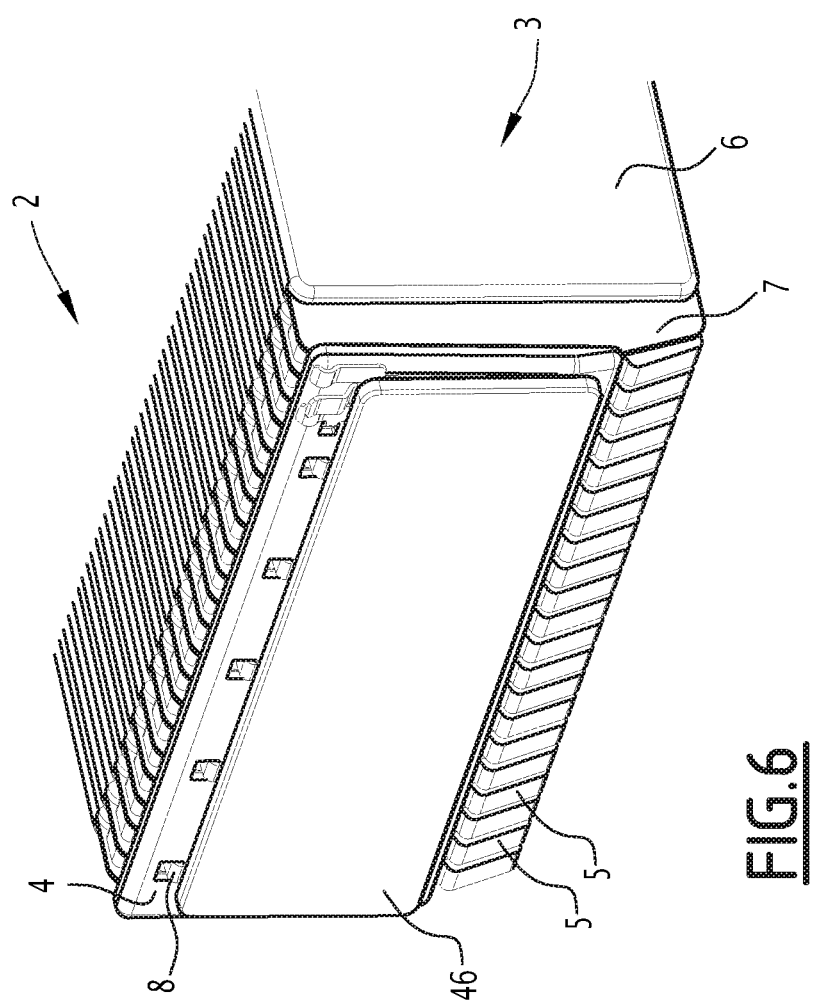

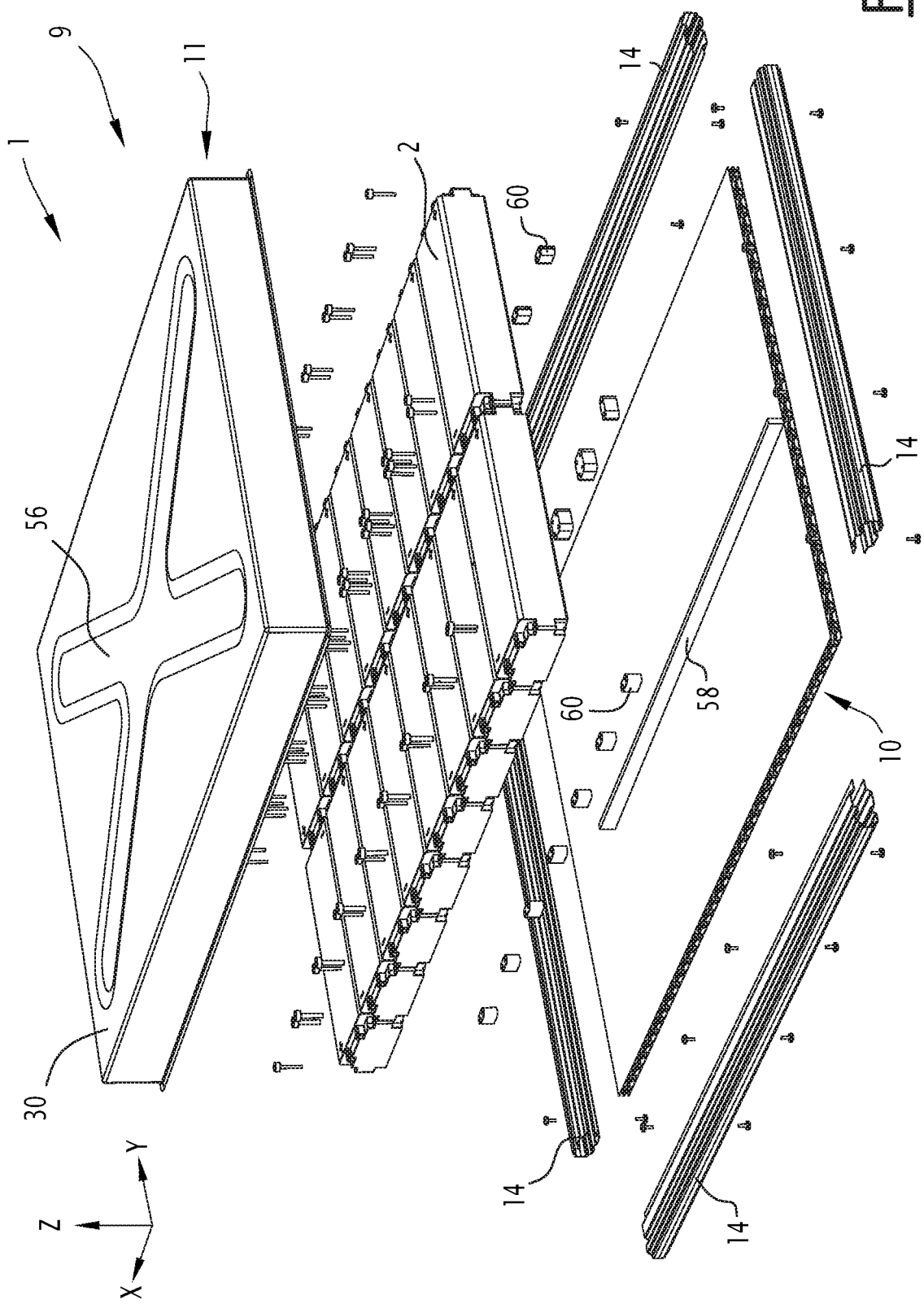

VEHICLE CHASSIS WITH ELECTRICAL STORAGE CELL INTEGRATION

CROSS-REFERENCE TO RELATED APPLICATIONS

This application is a U.S. non-provisional application claiming the benefit of French Application No. 19 08762, filed on Jul. 31, 2019, which is incorporated herein by reference in its entirety.

FIELD

The present invention relates to a vehicle chassis, in particular for a motor vehicle, designed to contain at least one electricity storage cells' module, the chassis comprising a bottom panel and at least one housing for the at least one electricity storage cells' module, each housing comprising a cover, the bottom panel supporting the housing in at least one region of contact with the housing, the chassis further comprising a cooling circuit of the at least one electricity storage cells' module, the cooling circuit being a closed circuit designed to guide a heat transfer fluid.

The vehicle chassis is, in particular, intended to be installed on a motor vehicle, for example a motor vehicle powered by an electric motor or a hybrid motor vehicle.

Such a motor vehicle conventionally comprises an energy storage assembly, comprising at least one electricity storage cells' module.

BACKGROUND

In vehicles requiring high storage of electrical energy, it is necessary to optimize the structure housing the electrical storage cells in order to limit the size of the energy storage assembly while maximizing the energy storage capacity on board the vehicle. It is also necessary to ensure the rigidity and resistance of the chassis to shocks, in particular to prevent damage to the electricity storage cells' modules.

To this end, it is known to use a chassis comprising a housing to house the electricity storage cells' modules comprising the electricity storage cells' modules, as well as a circuit for cooling the electricity storage cells' modules.

However, such a chassis can be bulky and its thickness can imply an elevation of the passenger compartment, thereby increasing the height of the vehicle.

SUMMARY

An object of the present disclosure is to obtain a chassis whose size is reduced, in particular whose height is reduced, whose rigidity is high, but whose capacity for housing the electricity storage cells' modules is high.

To this end, the object of the present disclosure is a vehicle chassis of the aforementioned type, in which the cooling circuit extends in the bottom panel and is arranged set back from the contact region, the bottom panel comprising at least two flat plates, and one embossed plate extending between the two flat plates, the bottom panel preferably comprising three flat plates and two embossed plates, each embossed plate extending between two consecutive flat plates.

The presence of a cooling circuit and, in particular, a closed cooling circuit with heat transfer fluid extending in the bottom panel makes it possible to minimize the height of the cooling circuit.

According to other advantageous aspects of the present disclosure, the vehicle chassis comprises one or more of the following characteristics, taken in isolation or in any technically feasible combination:

- the chassis comprises at least one U-shaped lateral damper, the lateral damper extending away from the bottom panel and being fixed, on the one hand, to an upper plate of the bottom panel and, on the other hand, to a lower plate of the bottom panel;
- the housing comprises at least one spar and at least one reinforcement, delimiting together with the bottom panel at least one chamber, each chamber being designed to house an electricity storage cells' module;
- the spar comprises a main profile and a secondary profile, the main profile and the secondary profile having a U-shaped profile, the base of the main profile being secured to the bottom panel and the secondary profile being nested and secured in the main profile on the side opposite the bottom panel;
- the chassis comprises at least one slide designed to fix the seat, the at least one slide being fixed to a respective spar through the cover;
- the spar is fixed to the bottom panel;
- the cover comprises at least one groove at the level of the spars, the or each groove being inserted in the U-shaped profile formed by a respective secondary profile;
- the bottom panel comprises at least one stamped boss on which is fixed at least one pad, each pad being designed to secure at least one electricity storage cells' module to the housing;
- the vehicle chassis comprises electricity storage cells' modules, the electricity storage cells' module comprising:
  a set of cells, each cell comprising:
    an electrode, and
    a main body,
  at least one interlayer,
  an electrode holder, and
  a spacer,
  each interlayer being arranged between two electrodes, as well as between the electrode holder and a respective main body.

The present disclosure also relates to a vehicle comprising a chassis as described above.

The present disclosure can further advantageously relate to a vehicle as mentioned above in which the chassis forms all or part of a floor of the vehicle.

BRIEF DESCRIPTION OF THE DRAWINGS

The invention will be better understood upon reading the description which follows, given solely by way of nonlimiting example and made with reference to the appended drawings, in which:

FIG. 6 is a representation of the electricity storage cells' module of FIG. 5 provided with a spacer for blocking the module; and FIG. 7 is an exploded representation of a chassis according to a second embodiment of the invention.

DETAILED DESCRIPTION

In the following description, we consider an orthonormal base (X, Y, Z). The direction of elevation Z is defined according to the height of the vehicle and corresponds, for example, to the vertical direction when the vehicle is on a horizontal road. The longitudinal direction X corresponds to the front-rear direction of the vehicle and the transverse direction Y corresponds to the width of the vehicle.

FIGS. 1 to 6 show a chassis 9 of a vehicle 1, according to a first exemplary embodiment of the invention. The chassis 9 also comprises a set of electricity storage cells' modules 2.

Figure 5:
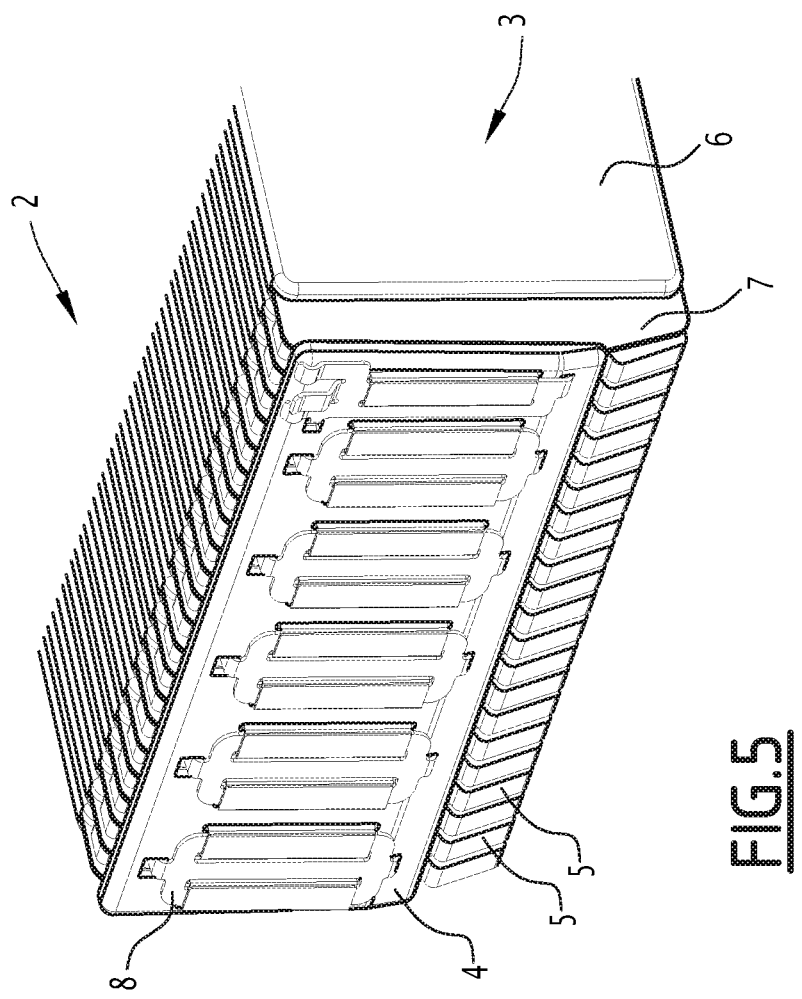
FIG. 5 is a representation of an electricity storage cells' module.

Each electricity storage cells' module 2, as visible in FIG. 5, comprises, for example, a set of electricity storage cells 3, an electrode holder 4, and interlayers 5.

The electricity storage cells 3 are cells such as lithium cells of the lithium-ion polymer (Li—Po), lithium-iron-phosphate (LFP), lithium-cobalt (LCO), lithium-manganese (LMO), nickel-manganese-cobalt (NMC), and nickel metalhydride (NiMH) type cells.

Each cell 3 comprises a main body 6, an electrode 7 and a plate 8, the electrode 7 being fixed on the plate 8. The electrode 7 is, for example, fixed by laser welding to the plate 8.

Each interlayer 5 is placed between two electrodes 7. Each interlayer 5 is, for example, made of polypropylene (PP), expanded polyethylene (PE) or expanded polystyrene (PS). Preferably, the interlayer 5 is made of polypropylene.

Each interlayer 5 is, for example, arranged between the main body 6 of each cell 3 and the electrode holder 4.

The electrode holder 4 is disposed between the plates 8 and the set of interlayers 5. The electrode holder 4 is, for example, formed from plastic such as polyamide.

The set of electricity storage cells' modules 2 is, for example, able to power an electric motor of vehicle 1, in a manner known per se.

The chassis 9 forms a low region of the vehicle 1, in particular placed under the passenger compartment.

The chassis 9 comprises a bottom panel 10, a housing 11 for the for electricity storage cells' module 2, and a cooling circuit 12 extending in the bottom panel 10.

The chassis 9 comprises a lateral damper 14 fixed along a periphery of the bottom panel 10, and a set of slides 16 fixed on the housing 11.

The bottom panel 10 comprises a lower plate 18, an upper plate 20 and an intermediate plate 22 arranged between the lower plate 18 and the upper plate 20, the lower 18, upper 20 and intermediate 22 plates extending substantially parallel to the plane (X, Y).

Figure 4:
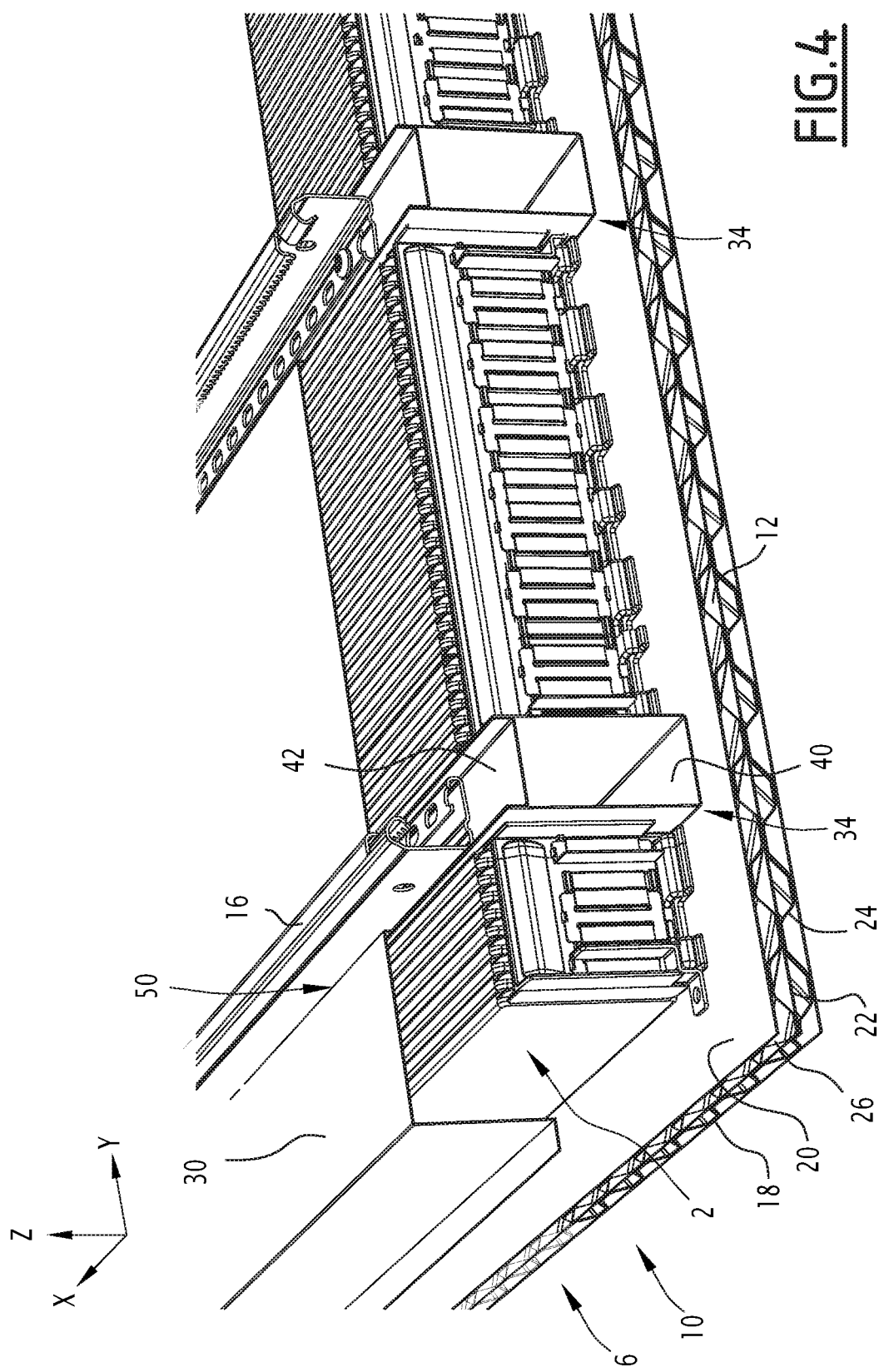
FIG. 4 is a schematic representation in partial section of a detail of the mounted chassis of FIG. 2, when it contains electricity storage cells' modules.

As illustrated in FIG. 4, the bottom panel 10 further comprises a lower embossed plate 24 and an upper embossed plate 26, the lower embossed plate 24 being arranged between the lower plate 18 and the intermediate plate 22, the upper embossed plate 26 being arranged between the upper plate 20 and the intermediate plate 22, the embossed plates 24, 26 extending substantially parallel to the plane (X, Y).

The lower 18, upper 20 and intermediate 22 plates are substantially flat and rectangular in shape.

The lower 18, upper 20 and intermediate 22 plates are preferably steel plates. Alternatively, the lower 18, upper 20 and intermediate 22 plates may be aluminum plates.

The upper plate 20 has a lower face in contact with the upper embossed plate 26, and an upper face, opposite the lower face, comprising a region of contact with the housing 11.

The lower 24 and upper 26 plates each preferably form a profile, the profile of which comprises a succession of slots, defining a groove. Each slot of this profile has a lower plate and an upper plate. The length of each lower plate and of each upper plate, in the direction perpendicular to the extrusion of the profile, is preferably substantially equal to 5 mm. The pitch, in the direction perpendicular to the extrusion of the profile, is, for example, substantially equal to 30 mm. In this second variant, each groove of the lower embossed plate 24 preferably extends at an angle of 45° relative to the longitudinal direction X.

Each groove of the upper embossed plate 26 preferably extends at an angle of −45° relative to the longitudinal direction X.

The profiles of the lower embossed plate 24 and the upper embossed plate 26 preferably form an angle of 90° to one another along the horizontal plane (X, Y).

According to the two variants of embossed plates, the height difference between the upper plate and the lower plate, or, in other words, the thickness of the lower 24 and upper 26 embossed plates is, for example, substantially equal to 14 mm. The upper and lower plates are connected by inclined faces, the inclination of which is, for example, substantially equal to 45° relative to the lower plate and to the upper plate.

The lower 24 and upper 26 embossed plates are, for example, steel plates. Alternatively, the embossed lower 24 and upper 26 plates may be made of aluminum.

The lower embossed plate 24 is fixed to the lower plate 18 and to the intermediate plate 22. In particular, the lower plates of the lower embossed plate 24 are fixed to the lower plate 18, while the upper plates of the lower embossed plate 24 are fixed to the intermediate plate 22.

The lower embossed plate 24 is preferably fixed to the lower plate 18 and to the intermediate plate 22 by welding. As a variant, the lower embossed plate 24 may be fixed to the lower plate 18 and to the intermediate plate 22 by brazing or by gluing.

The upper embossed plate 26 is fixed to the upper plate 20 and to the intermediate plate 22. In particular, the lower plates of the upper embossed plate 26 are fixed to the intermediate plate 22, while the upper plates of the upper embossed plate 26 are fixed to the upper plate 20.

The upper embossed plate 26 is preferably fixed to the upper plate 20 and to the intermediate plate 22 by welding. As a variant, the upper embossed plate 26 may be fixed to the upper plate 20 and to the intermediate plate 22 by brazing or by gluing.

The housing 11 includes a cover 30 defining an interior volume 32.

The housing 11 furthermore comprises a plurality of spars 34, reinforcements 36, and lateral beams 38, extending in the internal volume 32. Each spar 34 extends in height (in the direction of elevation Z) between the bottom panel 10 and the cover 30.

Each spar 34 advantageously comprises a main profile 40 and a secondary profile 42, the secondary profile 42 being nested and secured in the main profile 40.

Each spar 34 advantageously extends parallel to a flange of the cover 30 and each spar 34 possibly connects at its end two flanges of the cover 30 which are perpendicular to it.

In particular, each spar 34 extends in the longitudinal direction X and can connect two transverse edges of the cover 30.

The main profile 40 has a U-shaped profile. In other words, the main profile 40 has a base as well as two parallel sections extending on the same side of the base.

The base of the main profile 40 of each spar 34 is preferably kept in contact with the upper plate 20 of the bottom panel 10. The two parallel sections of the main profile 40 extend in the direction of the cover 30.

The secondary profile 42 of each spar 34 has a U-shaped profile. In other words, the secondary profile 42 has a base as well as two parallel sections extending on the same side of the base.

The U-shaped profiles of the main profile 40 and the secondary profile 42 have the same orientation. The base of the U formed by the profile of the secondary profile 42 is closer to the base of the U formed by the profile of the main profile 40 than the parallel sections of the U formed by the profile of the secondary profile 42.

The parallel sections of the U of the secondary profile 42 are shorter than the parallel sections of the U of the main profile 40.

The parallel sections of the U of the secondary profile 42 are secured inside the parallel sections of the U of the main profile 40.

Each lateral beam 38 extends parallel to at least one spar 34. The housing 11 advantageously comprises two lateral beams 38. As a variant, the reception box 11 need not include a lateral beam 38.

Figure 1:
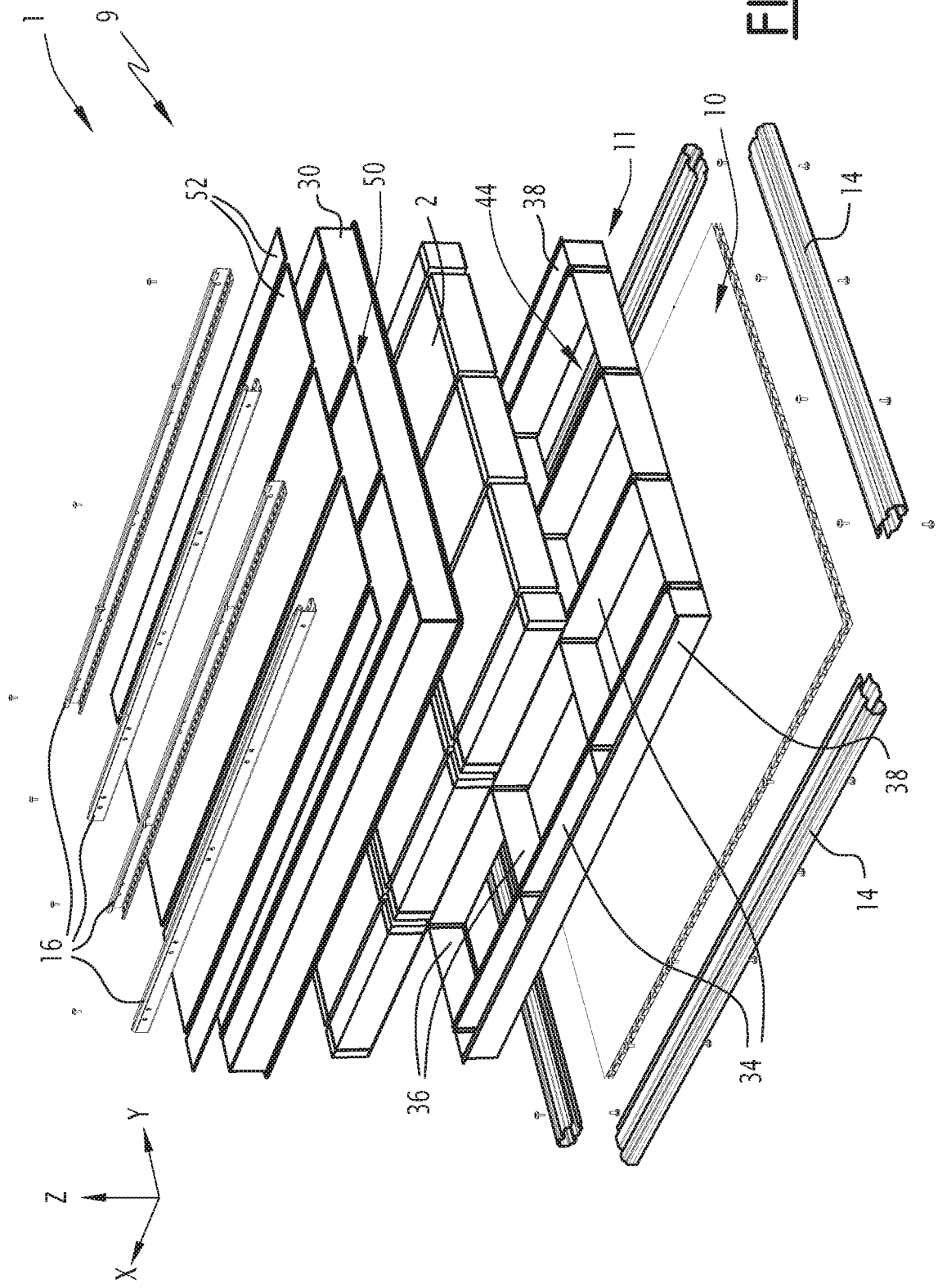
FIG. 1 is an exploded schematic representation of a chassis according to a first embodiment of the invention.

In the variant shown in FIG. 1, where the housing 11 comprises two lateral beams 38, the set of spars 34 is arranged between the two lateral beams 38. Each lateral beam 38 then extends along a edge of the cover 30, preferably a longitudinal edge of the cover 30.

Each lateral beam 38 has a C-shaped profile. In other words, each profile of each lateral beam 38 has a base as well as two parallel sections, extending on the same side of the base.

In the first embodiment presented, the base of the C-profile of each lateral beam 38 is substantially the same height as the parallel sections of the profile of the main profile 40.

The base of the C-profile of each lateral beam 38 is, for example, parallel to the parallel sections of the profile of the main profile 40, while the legs of the C-profile of each lateral beam 38 extend in the direction opposite to the spars 34, towards a flange of the cover 30.

A parallel section of the C-profile of each lateral beam 38 is advantageously fixed to the cover 30.

Each reinforcement 36 extends in the transverse region Y between two adjacent spars 34 and connects them, or extends in the transverse region Y between a spar 34 and a lateral beam 38 and connects them.

Each reinforcement 36 has a C-shaped profile. The C-shaped profile of the reinforcement 36 extends over its edge, on the bottom panel 10. The length of the extrusion of the C-shaped profile corresponds to the height of the reinforcement 36 and it is substantially equal to the length of the base of the C-profile of each lateral beam 38 and/or to the length of the U-shaped legs of the secondary profile 42.

The base of the C-profile of each reinforcement 36 extends between two spars 34 and connects them, or between a spar 34 and a lateral beam 38 and connects them.

The base of the C-profile of each reinforcement 36 extends substantially in the transverse direction Y.

The legs of the C-profile of each reinforcement 36 extend parallel to each other and are fixed to a leg of the U-profile of each main profile 40 and to the base of the C-profile of each lateral beam 38.

The bottom panel 10, each spar 34, each reinforcement 36 and each lateral beam 38 define a set of chambers 44 in the interior volume 32. Each chamber 44 is intended to respectively house at least one electricity storage cells' module 2.

Each chamber 44 is, for example, of parallelepiped shape.

At least one of the chambers 44 advantageously comprises a spacer 46 designed to block the position of the electricity storage cells' module 2 in this chamber 44. In particular, the spacer 46 is designed to fill the space between the electricity storage cells' module 2 and a spar 34 and/or a reinforcement 36 and/or a lateral beam 38. The spacer 46 is, for example, made of a dielectric material, for example similar to that forming the interlayer 5.

The cover 30 has the general shape of a bowl. The cover 30 is rectangular in shape and includes a bottom and rims. The bottom of the cover 30 has an interior surface facing the interior volume 32, and an exterior surface opposite the interior surface. The rims of the cover 30 are connected to the upper plate 20 of the bottom panel 10. The housing 11 comprises, for example, staples securing the cover 30 of the bottom panel 10.

The bottom of the cover 30 advantageously comprises at least one groove 50. Each groove 50 extends parallel to the set of spars 34 and forms a depression in the housing 11 in the interior volume 32.

In particular, each groove 50 is inserted into the U-shaped profile formed by the secondary profile 42 of a spar 34.

Each slide 16 is designed for fixing a vehicle seat, preferably a motor vehicle seat.

Each slide 16 extends on the external face of the bottom of the cover, i.e. on the surface opposite to the internal volume 32.

Each slide 16 is parallel to the set of spars 34. Each slide 16 extends, for example, on the cover 30 facing a spar 34, the slide 16 and the spar 34 being placed on either side of the cover 30.

In particular, each slide 16 is fixed to a spar 34 through the cover 30.

In the embodiment presented in FIG. 4, the slide 16 extends in the groove 50.

Figure 2:
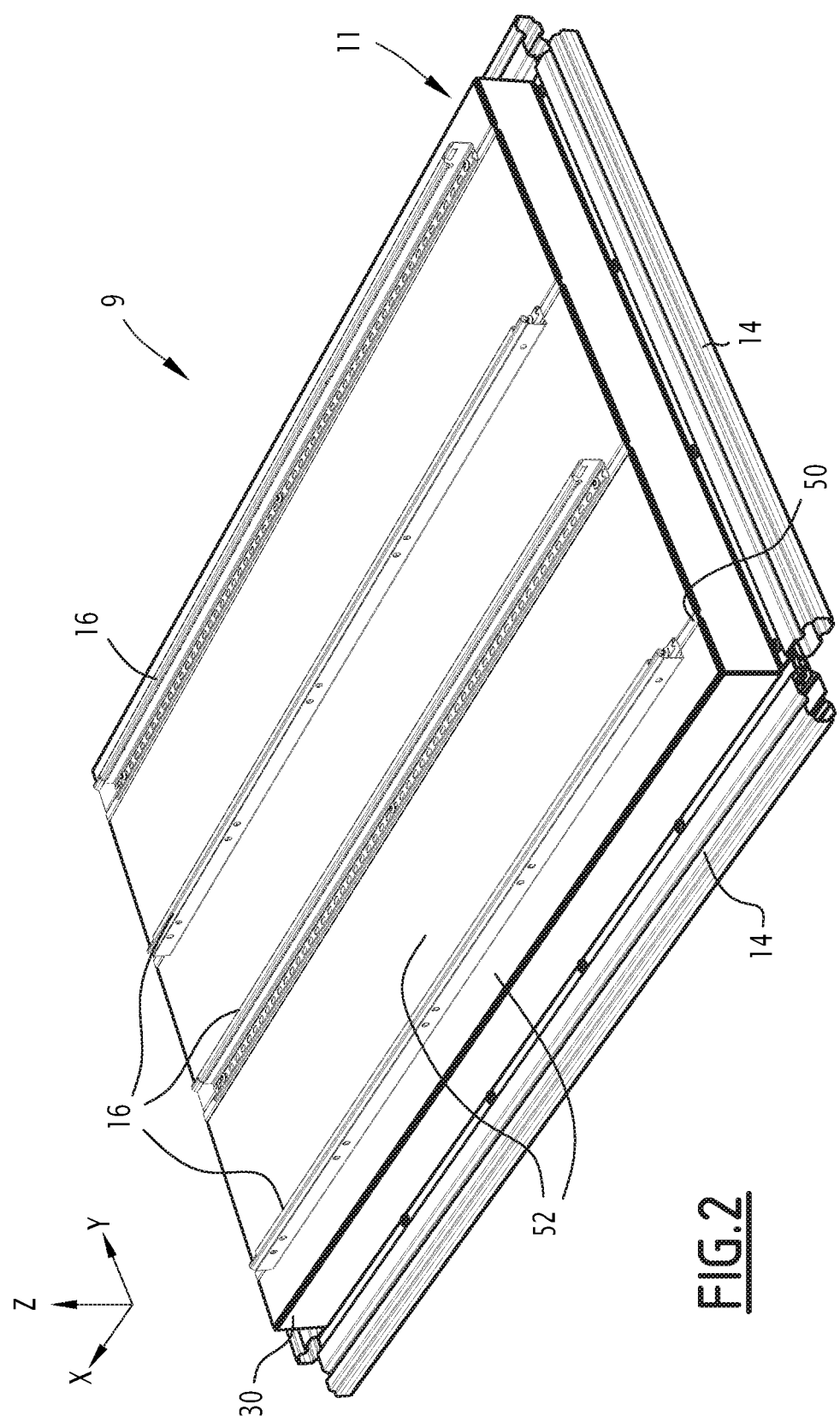
FIG. 2 is a schematic representation of the chassis of FIG. 1 when mounted.
Figure 3:
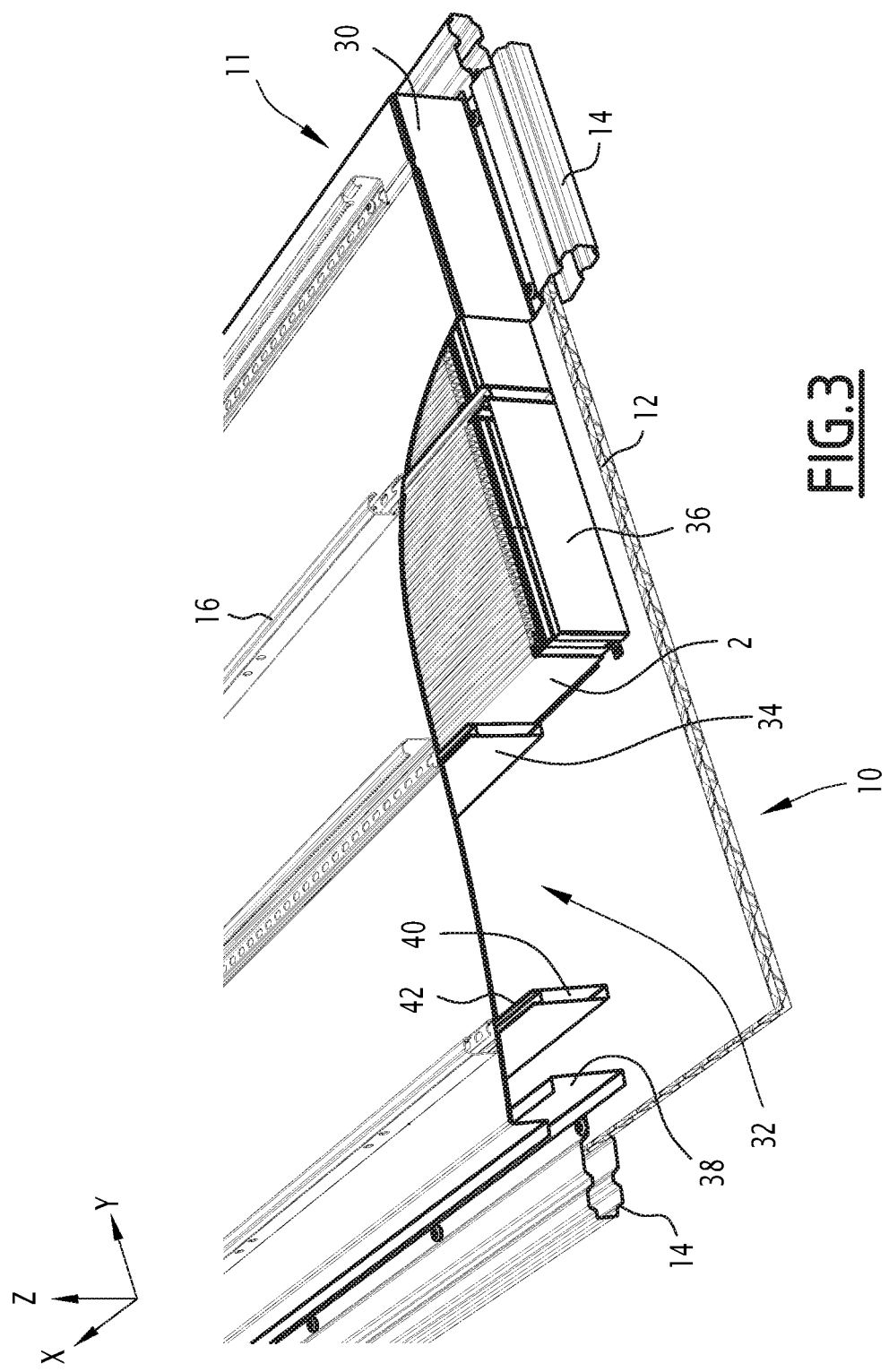
FIG. 3 is a schematic representation in partial section of a detail of the mounted chassis of FIG. 2.

In the embodiment presented in FIG. 1 and in FIG. 2, the chassis 9 comprises facing pieces 52. The facing pieces 52 are fixed to the outside face of the bottom of the cover 30. In particular, the facing pieces 52 cover regions of the outer face of the cover 30 extending on either side of the slides 16. The facing pieces 52 comprise, for example, a layer made of a flame-retardant material.

Each facing piece 52 has a fire-retardant and sound-absorbing function. Each facing piece 52 is rigid enough to support the weight of the occupant or his luggage. Each facing piece is typically covered with carpet visible to the occupant of the vehicle when looking at the interior floor.

The cooling circuit 12 is a closed circuit. The cooling circuit 12 is designed to guide a heat transfer fluid.

The cooling circuit 12 is designed to dissipate the heat generated by the electricity storage cells' modules 2.

The cooling circuit 12 extends into the bottom panel 10. The cooling circuit 12 is arranged set back from the region of contact of the bottom panel 10 with the housing 11.

The cooling circuit 12 then extends opposite the electricity storage cells' modules 2, the upper plate 20 of the bottom panel 10 being interposed between the electricity storage cells' modules 2 and the cooling circuit 12.

The cooling circuit 12 extends, in particular, between the upper plate 20 and the intermediate plate 22. The layout of the cooling circuit is, for example, defined by the embossed plate 26. The embossed plate 26 forms the cooling circuit 12, for example, in cooperation with the intermediate plate 20.

The lateral damper 14 has a substantially U-shaped profile. The profile of the lateral damper 14 has two legs, as well as a section connecting the two legs.

The lateral damper 14 extends away from the bottom panel 10. The lateral damper 14 is fixed, on the one hand, to the upper plate 20 of the bottom panel 10 and, on the other hand, to the lower plate 18 of the bottom panel 10.

More particularly, the connecting section of the lateral damper 14 extends away from the bottom panel 10, a first leg of the U-shaped profile of the damper is linked to the lower plate 18 while a second leg of the U-profiled damper is linked to the upper plate 20.

The profile of the lateral damper 14 includes, for example, a recess on each leg, designed to act as a folding initiator.

The chassis 9 presented in FIGS. 1 and 2 comprises four dampers, each damper extending on one side of the bottom panel 10.

The operation of a chassis 9 according to the invention will now be presented.

When the electricity storage cells' modules 2 are in operation, i.e. for example when they supply electrical energy to a vehicle motor 1, the electricity storage cells' modules 2 generate heat.

The upper plate 20 of the bottom panel 10 conducts the heat from each electricity storage cells' module 2 to the cooling circuit 12 disposed in the bottom panel 10. The heat transfer fluid contained in the cooling circuit 12 then conducts the heat generated by the electricity storage cells' modules 2 and dissipates this heat out of the chassis 9, for example through a heat sink such as a radiator.

Such a chassis 9 of vehicle 1 may be advantageous since its bulk is reduced while offering a high capacity for housing electricity storage cells' modules 2, in particular thanks to the arrangement of the cooling circuit 12 in the bottom panel 10. The chassis 9 replaces the standard floor of a vehicle.

Another potential advantage of the aforementioned chassis relates to the introduction of the dashboard into the chamber. The dashboard introduction is no longer effected through the opening of a door guided by an operator, but through the opening in the floor which is reserved for the chassis 9. As this opening is significantly larger, this may be carried out much more easily and automatically, for example by a robot.

Regarding the seats, these are fixed to the chassis 9 beforehand. The chassis 9 and seat assembly is placed on a trolley on an assembly line.

The body descends onto the assembly formed by the chassis 9 and the seat and this assembly is fixed to the body. This installation is much faster and avoids any risk of damage when passing through the door opening.

The rigidity of the chassis 9 is further improved by the sandwich structure of the plates 18, 20, 22 and of the embossed plates 24, 26.

The presence of a lateral damper 14 is particularly advantageous for protecting the electricity storage cells' modules 2 in the event of a shock and thus allows the design of a chassis 9 comprising electricity storage cells' modules 2 in regions close to the ends of the chassis 9.

The structure of the electricity storage cells' module 2, in particular through the use of interlayers 5, allows a distribution of the forces applied to the module 2.

The structure of the spars 34 as well as the presence of slides 16 directly fixed to the spars 34 makes it possible to use the holding structure of the electricity storage cells' modules 2 for holding seats in the passenger compartment, thereby simplifying the structure of the vehicle 1 and reducing the vertical size of the chassis 9.

The presence of grooves 50 in the cover 30 makes it possible to lower the point of attachment of the slides 16 and thus makes it possible to reduce the vertical size of the chassis 9 and thus the overall height of the vehicle 1.

FIG. 7 shows a second embodiment of a chassis 9. This embodiment differs from the first embodiment previously described only by what follows. Similar elements have the same references.

According to this second embodiment, the housing 11 has no spar 34, no reinforcement 36 and no lateral beam 38. The cover 30 also does not have a groove 50.

The cover 30 comprises, according to the second embodiment, a central stiffener 56.

The bottom panel 10, and, more particularly, the upper plate 20, comprises, for example according to the second embodiment, a stiffening beam 58 extending longitudinally on the upper plate 20 and fixed on the upper plate 20. As a variant, the stiffening beam 58 may be formed by embossing the upper plate 20.

The bottom panel 10 also includes at least one pad 60, each pad 60 being designed to fix at least one electricity storage cells' module 2 to the housing 11. Each pad 60 is fixed, advantageously welded, to the upper plate 20 and/or to the stiffening beam 58.

A fixing member such as, for example, a screw or a rivet secures each electricity storage cells' module 2 to a pad 60.

A chassis 9 according to the second embodiment forms, for example, a secondary vehicle chassis designed to be fixed under a main chassis.

The invention claimed is:

1. A chassis of a vehicle, designed to contain at least one electricity storage cells' module, the chassis comprising
    a bottom panel,
    a housing for the at least one electricity storage cells' module, each housing comprising a cover, the bottom panel supporting the housing in at least one region of contact with the housing, and
    a cooling circuit of the at least one electricity storage cells' module, the cooling circuit being a closed circuit designed to guide a heat transfer fluid,
    wherein the cooling circuit extends in the bottom panel and is set back from the contact region, and wherein the bottom panel comprises three flat plates and two embossed plates, each embossed plate extending between two consecutive flat plates.

2. The chassis according to claim 1, wherein the chassis is a chassis of a motor vehicle.

3. The chassis according to claim 1, wherein the chassis comprises at least one U-shaped lateral damper, the lateral damper extending away from the bottom panel and fixed, on the one hand, to an upper plate of the bottom panel and, on the other hand, to a lower plate of the bottom panel.

4. A chassis of a vehicle, designed to contain at least one electricity storage cells' module, the chassis comprising
    a bottom panel,
    a housing for the at least one electricity storage cells' module, each housing comprising a cover, the bottom panel supporting the housing in at least one region of contact with the housing, and a cooling circuit of the at least one electricity storage cells' module, the cooling circuit being a closed circuit designed to guide a heat transfer fluid, wherein the cooling circuit extends in the bottom panel and is set back from the contact region, the bottom panel comprising at least two flat plates and an embossed plate extending between the two flat plates, and wherein the housing comprises at least one spar and at least one reinforcement, delimiting together, with the bottom panel at least one chamber, each chamber being designed to house an electricity storage cells' module.

5. The chassis according to claim 4, wherein the spar comprises a main profile and a secondary profile, the main profile and the secondary profile having a U-shaped profile, the base of the main profile being secured to the bottom panel and the secondary profile being nested and secured in the main profile, on the side opposite to the bottom panel.

6. The chassis according to claim 4, further comprising at least one slide designed for fixing a seat, the at least one slide being respectively fixed to a spar through the cover.

7. The chassis according to claim 4, wherein the spar is fixed to the bottom panel.

8. The chassis according to claim 4, in which the cover comprises at least one groove at the level of the spars, the or each groove being inserted into the U-shaped profile formed by a respective secondary profile.

9. The chassis according to claim 1, wherein the bottom panel comprises at least one pad, each pad being designed to secure at least one electricity storage cells' module to the housing.

10. A chassis of a vehicle, designed to contain at least one electricity storage cells' module, the chassis comprising
    a bottom panel,
    a housing for the at least one electricity storage cells' module, each housing comprising a cover, the bottom panel supporting the housing in at least one region of contact with the housing, and
    a cooling circuit of the at least one electricity storage cells' module, the cooling circuit being a closed circuit designed to guide a heat transfer fluid, wherein the cooling circuit extends in the bottom panel and is set back from the contact region, the bottom panel comprising at least two flat plates and an embossed plate extending between the two flat plates, and wherein the chassis of the vehicle comprises an electricity storage cells' module, the electricity storage cells' module comprising:
    a set of cells, each cell comprising:
    an electrode, and
    a main body,
    at least one interlayer,
    an electrode holder,
    a spacer, and
    each interlayer being disposed between two electrodes, as well as between the electrode holder and a respective main body.

* * * * *